(12) United States Patent
Bruhn et al.

(10) Patent No.: US 11,273,708 B2
(45) Date of Patent: Mar. 15, 2022

(54) TRANSFER GEAR

(71) Applicant: Magna Powertrain GmbH & Co KG, Lannach (AT)

(72) Inventors: Florian Bruhn, Graz (AT); Martin Stocker, Feldkirchen bei Graz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 296 days.

(21) Appl. No.: 16/499,451

(22) PCT Filed: Feb. 7, 2018

(86) PCT No.: PCT/EP2018/053039
§ 371 (c)(1),
(2) Date: Sep. 30, 2019

(87) PCT Pub. No.: WO2018/177634
PCT Pub. Date: Oct. 4, 2018

(65) Prior Publication Data
US 2020/0047614 A1 Feb. 13, 2020

(30) Foreign Application Priority Data

Mar. 30, 2017 (DE) .......................... 102017205396.8

(51) Int. Cl.
*B60K 23/08* (2006.01)
*B60K 17/344* (2006.01)
*F16D 27/115* (2006.01)
*F16H 48/30* (2012.01)
(Continued)

(52) U.S. Cl.
CPC ............ *B60K 23/08* (2013.01); *B60K 17/344* (2013.01); *F16D 27/115* (2013.01);
(Continued)

(58) Field of Classification Search
CPC .... B60K 23/08; B60K 17/344; B60K 17/352; B60K 2023/0858; B60K 2023/0883;
(Continued)

(56) References Cited

U.S. PATENT DOCUMENTS

| 5,884,526 A * | 3/1999 | Fogelberg .............. B60K 23/08 74/335 |
| 2007/0209462 A1 | 9/2007 | Suzuki et al. |
| 2018/0023635 A1* | 1/2018 | Neelakantan ......... F16D 25/082 475/149 |
| 2018/0208057 A1* | 7/2018 | Yoshimura .............. F16D 11/14 |

FOREIGN PATENT DOCUMENTS

| AT | 007553 U1 | 5/2005 |
| DE | 10033482 | 10/2001 |

(Continued)

OTHER PUBLICATIONS

Written Opinion of the International Searching Authority for International Application No. PCT/EP2018/053039; dated Jul. 10, 2018; 5 pages.

(Continued)

*Primary Examiner* — David J Hlavka
(74) *Attorney, Agent, or Firm* — Dickinson Wright PLLC

(57) ABSTRACT

The present invention relates to a transfer gearbox having an input shaft, a first output shaft, a second output shaft, a friction clutch, by means of which, in a manner which is dependent on its engagement state, a variable proportion of a drive torque which is transmitted from the input shaft to the first output shaft can be transmitted to the second output shaft, and a rotationally driven actuator unit for controlling the engagement state of the friction clutch. Furthermore, the transfer gearbox has an electromagnetically actuable latch for locking the actuator unit as required.

20 Claims, 5 Drawing Sheets

Figure 1:
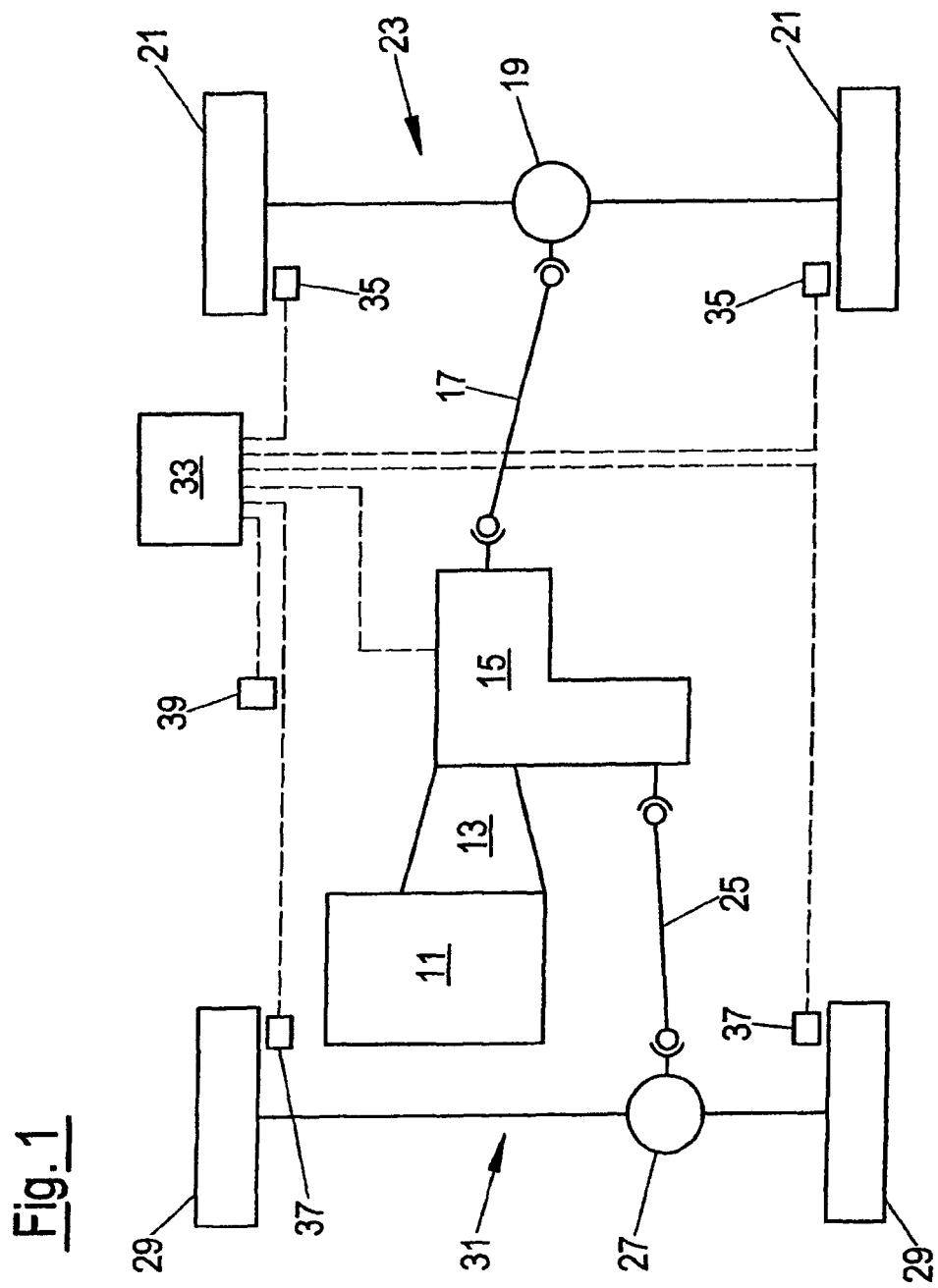

(51) Int. Cl.
*F16D 13/52* (2006.01)
*F16H 1/28* (2006.01)

(52) U.S. Cl.
CPC .... *B60K 17/352* (2013.01); *B60K 2023/0858* (2013.01); *B60K 2023/0883* (2013.01); *F16D 13/52* (2013.01); *F16H 1/28* (2013.01)

(58) Field of Classification Search
CPC ............ B60K 23/0808; B60K 17/3467; B60K 17/35; B60K 2023/0825; B60K 5/02; F16D 27/115; F16D 13/52; F16H 1/28
See application file for complete search history.

(56) References Cited

FOREIGN PATENT DOCUMENTS

| | | |
|---|---|---|
| DE | 10335507 | 2/2004 |
| DE | 10303831 | 8/2004 |
| DE | 102008032477 A1 | 1/2010 |
| DE | 102015225290 | 6/2016 |
| DE | 102016211003 A1 | 1/2017 |
| DE | 102016215148 | 2/2018 |

OTHER PUBLICATIONS

International Search Report (ISR) for International Application No. PCT/EP2018/053039; dated Jul. 10, 2018; 8 pages English Translation of the ISR is Included.

* cited by examiner

TRANSFER GEAR

CROSS-REFERENCE TO RELATED APPLICATIONS

This application is a National Stage of International Application No. PCT/EP2018/053039 filed Feb. 7, 2018, and titled "Transfer Gear," which claims the benefit of German Patent Application No. 10 2017 205 396.8 filed on Mar. 30, 2017, and titled "Transfer Case", the entire disclosures of each of the above applications are hereby incorporated by reference.

FIELD OF THE INVENTION

The present invention relates to a transfer gearbox for the transmission of a drive torque from an input shaft to a primary axle and/or a secondary axle of a motor vehicle.

More precisely, the invention relates to a transfer gearbox of this type, in the case of which the transmission of the drive torque takes place by means of a friction clutch, by means of which, in a manner which is dependent on its engagement state, the transmission of the drive torque from an input shaft to a first output shaft and to a second output shaft can be controlled, the friction clutch, in particular, transmitting a variable proportion of the drive torque which is transmitted from the input shaft to a first output shaft which is assigned to the primary axle to a second output shaft which is assigned to the secondary axle in a manner which is dependent on the engagement state of said friction clutch, it being possible for the engagement state of the friction clutch to be controlled by means of a rotationally driven actuator unit.

BACKGROUND OF THE INVENTION

This section provides background information related to the present disclosure which is not necessarily prior art.

A transfer gearbox of this type is described, for example, in DE 10 2008 032 477 A1. In said document, the friction clutch serves for the controllable transmission of a drive torque to a primary axle and/or a secondary axle of the motor vehicle. In the case of what is known as a "torque on demand" transfer gearbox, the wheels of the primary axle are driven permanently, whereas a variable portion of the drive torque can be transmitted selectively to the wheels of the secondary axle by means of said friction clutch. The transfer gearbox can also be configured as a controllable center differential, in the case of which the front axle and the rear axle are driven permanently, the clutch unit being assigned to a differential lock, in order to set the distribution of the drive torque in the longitudinal direction of the vehicle. A transfer gearbox of said type can also be formed by way of a torque transmission arrangement which, in a motor vehicle having a permanently driven front axle (as primary axle), permits the controllable transmission of a portion of the drive torque to the rear axle (as secondary axle), the unit being arranged, for example, on the front axle differential or on the rear axle differential (transfer gearbox with what is known as a "hang-on clutch"). Different applications and arrangements of this type are known from U.S. Pat. No. 7,111,716 B2.

In order for it to be possible for a proportion of the drive torque to be transmitted from the input shaft or the first output shaft which is connected to it fixedly so as to rotate with it to the second output shaft during the driving operation of a vehicle, the friction clutch is engaged at least partially by means of the actuator unit, with the result that there is a drive connection from the input shaft to both the first output shaft and the second output shaft. In the case of a parked vehicle and/or a switched off ignition, the friction clutch is situated in its disengaged state, however, with the result that there is no drive connection between the input shaft and the second output shaft or the secondary axle of the vehicle. Therefore, the secondary axle can rotate freely in the case of a parked vehicle, as long as that second output shaft of the transfer gearbox which is assigned to the secondary axle is not locked by means of a blocking device which is provided expressly for this purpose, such as a magnetic brake.

It is desirable precisely in the case of a parked vehicle, however, for it to be possible for both the primary axle and the secondary axle of a vehicle to be blocked, in order that the vehicle cannot be set unintentionally in motion. Although a parking brake can act, for example, on the primary axle of a vehicle, if the vehicle is parked, for example, on a slope and the wheels of the primary axle are situated on a smooth underlying surface, the vehicle, despite the actuated parking brake, can be set in motion in some circumstances on account of an absence of a drive connection between the primary axle and the secondary axle, if the secondary axle is not blocked, for example, by means of an additional brake, for example a magnetic brake.

SUMMARY OF THE INVENTION

This section provides a general summary of the disclosure, and is not a comprehensive disclosure of its full scope or all of its features.

The invention is therefore based on the object of specifying a transfer gearbox, by means of which it can be reliably prevented that a vehicle which is equipped with it can be set unintentionally in motion during a switched-off state.

Said object is achieved by way of a transfer gearbox having the features of claim 1 and, in particular, by virtue of the fact that the transfer gearbox has an electromagnetically actuable latch for locking the actuator unit as required.

By virtue of the fact that the electromagnetically actuable latch interacts with the actuator unit, by means of which the engagement state of the friction clutch can be controlled, the friction clutch can be blocked by means of the latch in an at least partially engaged state. Therefore, a drive connection between the first output shaft and the second output shaft or between the primary axle which is assigned to the first output shaft and the secondary axle of the vehicle which is assigned to the second output shaft can be established or maintained via the friction clutch, even in the case of a parked vehicle. Therefore, if, for example, the primary axle of the vehicle is blocked by means of a parking brake in the case of a parked vehicle, the braking effect which is brought about as a result likewise acts on the secondary axle of the vehicle on account of the blocking of the friction clutch by way of the latch, with the result that both the primary axle and the secondary axle are blocked.

Here, the electromagnetically actuable latch can interact in a positively locking manner with an actuator member of the actuator unit, with the result that the actuator unit can maintain the engagement state of the friction clutch even when the electromagnet for actuating the latch is currentless in the case of a switched off vehicle ignition. Although it can be provided to this end in accordance with one preferred embodiment that, in the non-energized state of the electromagnet, the latch is situated in an extended or disengaged position, in order to be in engagement with the actuator unit, it can also be provided, however, that the electromagnet has to be energized, in order to extend or disengage the latch and therefore to bring it into positively locking engagement with the actuator unit. Thus, for example, the extended state of the electromagnetically actuable latch can be secured by means of a locking pawl, with the result that the latch or its electromagnet does not have to be energized permanently in the case of a parked vehicle, in order for it to be possible for the engagement state of the friction clutch to be maintained.

In the following text, preferred embodiments of the invention will now be described. Furthermore, further embodiments can result from the dependent claims, the description of the figures, and the drawings.

It can thus be provided in accordance with one embodiment that the actuator unit comprises at least one rotatable actuator member which can be locked by way of the latch. In particular, the electromagnetically actuable latch can engage in a positively locking manner into the rotatable actuator member for locking the actuator unit as required. For example, the actuator unit can be actuated by way of an electric motor which, via a reduction gear mechanism which is preferably configured as a worm gear mechanism consisting of a worm gear shaft and a worm gear, can rotationally adjust at least one of two ramp rings or cam rings, of which one can be moved axially, in order for it to be possible for the friction clutch to be engaged. As a consequence of a movement in the opposite direction which is brought about in this way of the two ramp rings, an axial movement of the one ramp ring can occur, by way of which the friction clutch can be engaged, as is described in DE 10 2008 032 477 A1.

In the case of the actuator member in question, into which the electromagnetically actuable latch engages in a positively locking manner for locking the actuator unit as required, it can therefore be, for example, one of the ramp rings of the actuator unit which are driven at least indirectly by an electric motor, or another torque transmission element of the actuator unit in the power flow path upstream of the ramp ring, such as, for example, an actuator shaft which is driven by an electric motor, a gearwheel or worm gear which is connected fixedly to an actuator shaft so as to rotate with it, or a cam element which can be drive-connected or is drive-connected to an actuator shaft, by way of the rotation of which a lever which is coupled to at least one of the abovementioned ramp rings can be deflected in order to rotate the respective ramp ring, as is implemented, for example, in the case of the actuator unit of the transfer gearbox which is described in DE 10 2015 225 290 A1. Thus, in the case of said transfer gearbox, the ramp rings which are denoted there by way of the designations 188 and 190 are rotated relative to one another by way of rotation of one cam element in the form of what is known as a mode cam 184 which is connected fixedly to an actuator shaft so as to rotate with it and acts on a lever segment 232 which is connected to one of the ramp rings. Since the actuator unit of the transfer gearbox according to the invention can be of corresponding configuration, reference is explicitly made at this point with regard to further details of the actuator unit for the actuation of the friction clutch to DE 10 2015 225 290 A1, the corresponding disclosure of which is hereby included by way of reference as a constituent part of the present disclosure.

If, in the case of the transfer gearbox according to the invention, the latch therefore engages into an actuator member in the power flow path between the electric motor for actuating the actuator unit and the ramp ring for locking the actuator unit as required, the actuator unit and, as a result, the respective engagement state of the friction clutch can be secured or blocked by way of an engagement of this type. By way of the locking of the actuator unit, the engagement state of the friction clutch can therefore be locked with the consequence that the friction clutch cannot pass out of engagement in the parked state of the vehicle. As a result of the locking of the actuator unit or the locking of the friction clutch, the second output shaft is therefore drive-connected to the first output shaft and therefore to the input shaft of the transfer gearbox even in the case of a parked vehicle, with the result that the secondary axle of the vehicle can also be blocked in a desired way at the same time by way of blocking of the primary axle by means of a parking brake.

In accordance with a further embodiment, the actuator member can have a plurality of receptacles for the engagement or receiving of the electromagnetically actuable latch, the receptacles preferably being spaced apart from one another uniformly. Therefore, different engagement states of the friction clutch can be secured, whereby brake torques or else drive torques of different magnitude can be transmitted to the second output shaft depending on requirements, as can be desirable, in particular, when a constant torque proportion is to be transmitted permanently to the secondary axle during driving operation, as can be desirable, for example, during off-road operation.

In accordance with a further embodiment, the transfer gearbox according to the invention can comprise, like the transfer gearbox which is described in DE 20 1015 225 290 A1, furthermore, a reduction gear stage, preferably in the form of a planetary transmission, which can be switched by means of a shifting clutch between a direct or HI operating mode and a stepped-down or LO operating mode. Here, the shifting clutch has a first shifting position, in which it establishes a direct drive connection between the input shaft and an output shaft, in particular the first output shaft of the transfer gearbox, bypassing the reduction gear stage or its stepped-down effect (direct or HI operating mode), and a second shifting position, in which it establishes a drive connection between the reduction gear stage and the output shaft, in particular the first output shaft (stepped-down or LO operating mode). Here, the actuation of the shifting clutch or the shifting over thereof between its first and its second shifting position takes place via a shifting actuator with, for example, a shifting guide plate, both said shifting actuator for shifting the shifting clutch and the actuator unit for controlling the engagement state of the friction clutch being driven by a common or one and the same actuator shaft, as is also the case in the transfer gearbox which is described in DE 10 2015 225 290 A1. Accordingly, reference is once again made at this point explicitly to the corresponding disclosure of DE 10 2015 225 290 A1, the disclosure of which with regard to the common actuation of the friction clutch which is also called a mode clutch therein and the shifting clutch which is also called a range clutch therein, is hereby included explicitly by way of reference as a constituent part of the present disclosure.

As is described in detail in DE 10 2015 225 290 A1, both the shifting or range clutch and the friction or mode clutch can therefore be controlled by means of the common actuator shaft, with the result that, depending on the rotational position of the actuator shaft, different drive modes such as a four-wheel low range drive mode, a four-wheel high range drive mode or a two-wheel high range drive mode can be selected.

If the actuator unit is therefore locked in the way according to the invention by means of an electromagnetically actuable latch in order to control the engagement state of the friction clutch, a locking action of this type likewise brings about locking or blocking of the shifting or range clutch in the case of a transfer gearbox which is configured in accordance with DE 10 2015 225 290 A1. This can be desirable, in particular, during off-road operation, for example, in order to ensure that the shifting clutch cannot be actuated unintentionally.

It can therefore be provided in accordance with a further embodiment that, for locking as required both of the friction clutch and of the shifting clutch, the electromagnetically actuable latch engages in a positively locking manner into a gearbox element which is connected fixedly to the actuator shaft so as to rotate with it, such as the shifting actuator for the actuation of the shifting clutch. The gearbox element in question can also in this case in turn have a plurality of receptacles for the engagement or receiving of the electromagnetically actuable latch, in order for it thus to be possible for different engagement states of the friction clutch to be secured.

In accordance with a further embodiment, at least one stop can be provided and positioned on the same gearbox component which has the plurality of receptacles for the engagement or receiving of the electromagnetically actuable latch, such as the shifting actuator, the cam element which can be drive-connected to the actuator shaft, or the gearwheel or worm gear which is connected fixedly to the actuator shaft so as to rotate with it, in such a way that, when the latch bears against the at least one stop, a further rotation of the actuator shaft and therefore shifting over of the shifting clutch between its first shifting position and its second shifting position are prevented. A stop of this type can therefore prevent it being possible for the reduction gear stage to be switched over unintentionally between the direct or HI operating mode and the stepped-down or LO operating mode.

In accordance with a further embodiment, two stops of this type can be provided on the gearbox component in question, the first stop being positioned in such a way that, in the first shifting position of the shifting clutch when the latch bears against the first stop, a further rotation of the actuator shaft and therefore shifting over of the shifting clutch out of its first shifting position into its second shifting position are prevented. In a corresponding way, the second stop can be positioned in such a way that, in the second shifting position of the shifting clutch when the latch bears against the second stop, a further rotation of the actuator shaft and therefore shifting over of the shifting clutch out of its second shifting position into its first shifting position are prevented.

The shifting over of the shifting clutch thus namely does not take place suddenly; rather, a selector sleeve is adjusted successively over a rotary angular range of the actuator shaft or the shifting actuator by means of the shifting actuator. Accordingly, the two stops define as it were the two shifting positions of the shifting clutch or its selector sleeve, and therefore the corresponding rotational position of the actuator shaft. Therefore, the two stops can already counteract the attempt to shift the shifting clutch and therefore the reduction gear stage unintentionally. If, in contrast, shifting over of the reduction gear stage is to be capable of taking place deliberately, merely an energization of the electromagnet which is assigned to the latch is required. As a result, the latch can be withdrawn, with the result that the actuator shaft can be rotated in the desired way, without it being possible for blocking thereof to occur as a consequence of the latch bearing against one of the stops.

A further advantage results from the precise knowledge of the position of the stops and therefore the knowledge of the rotational position of the actuator shaft. The rotational position of the actuator shaft can thus be initialized, for example, during a starting operation of a vehicle, by the actuator shaft being rotated until one of the two stops comes to bear against the latch. In this way, the absolute rotational position of the actuator shaft can be determined within the context of an initialization, with the result that no additional sensor is required to this end.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
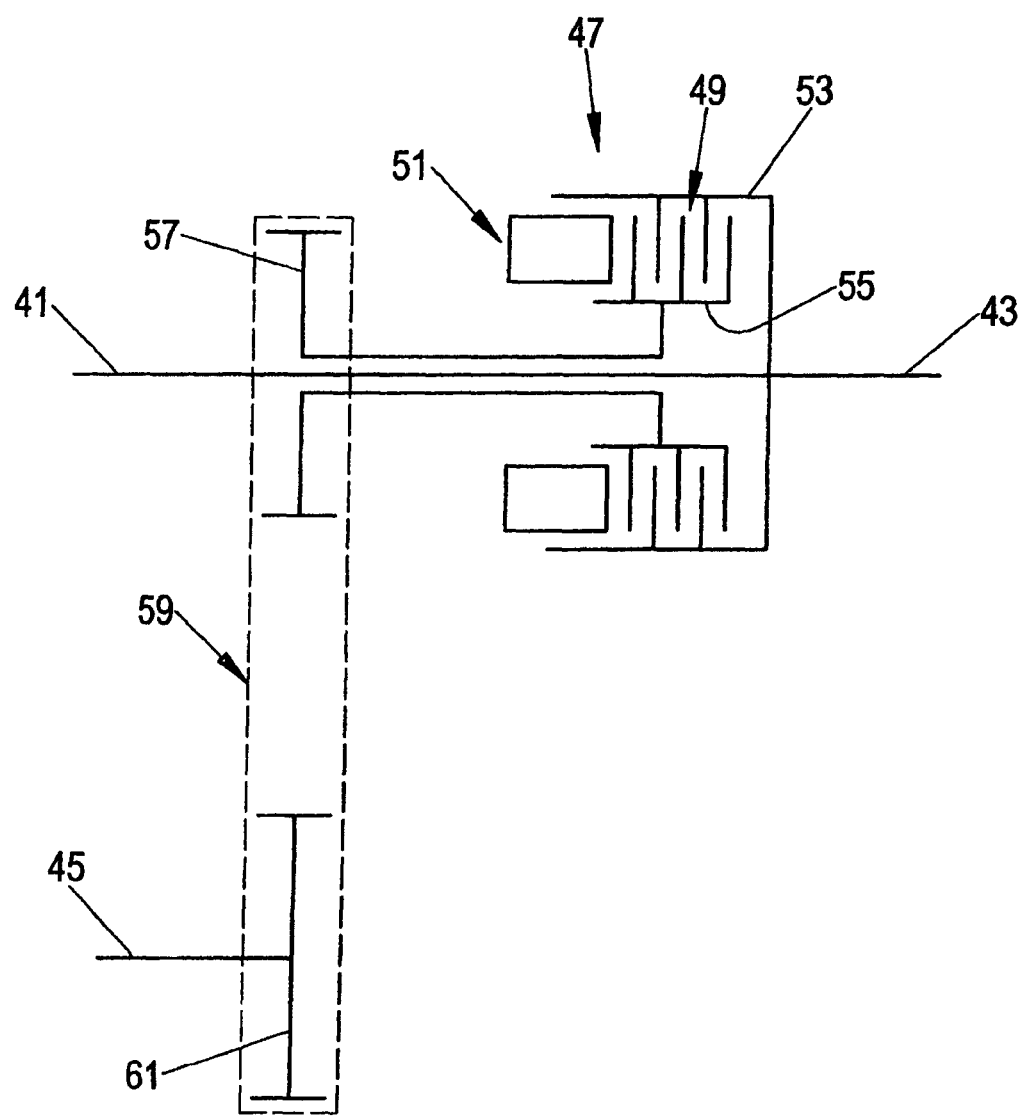
Figure 3:
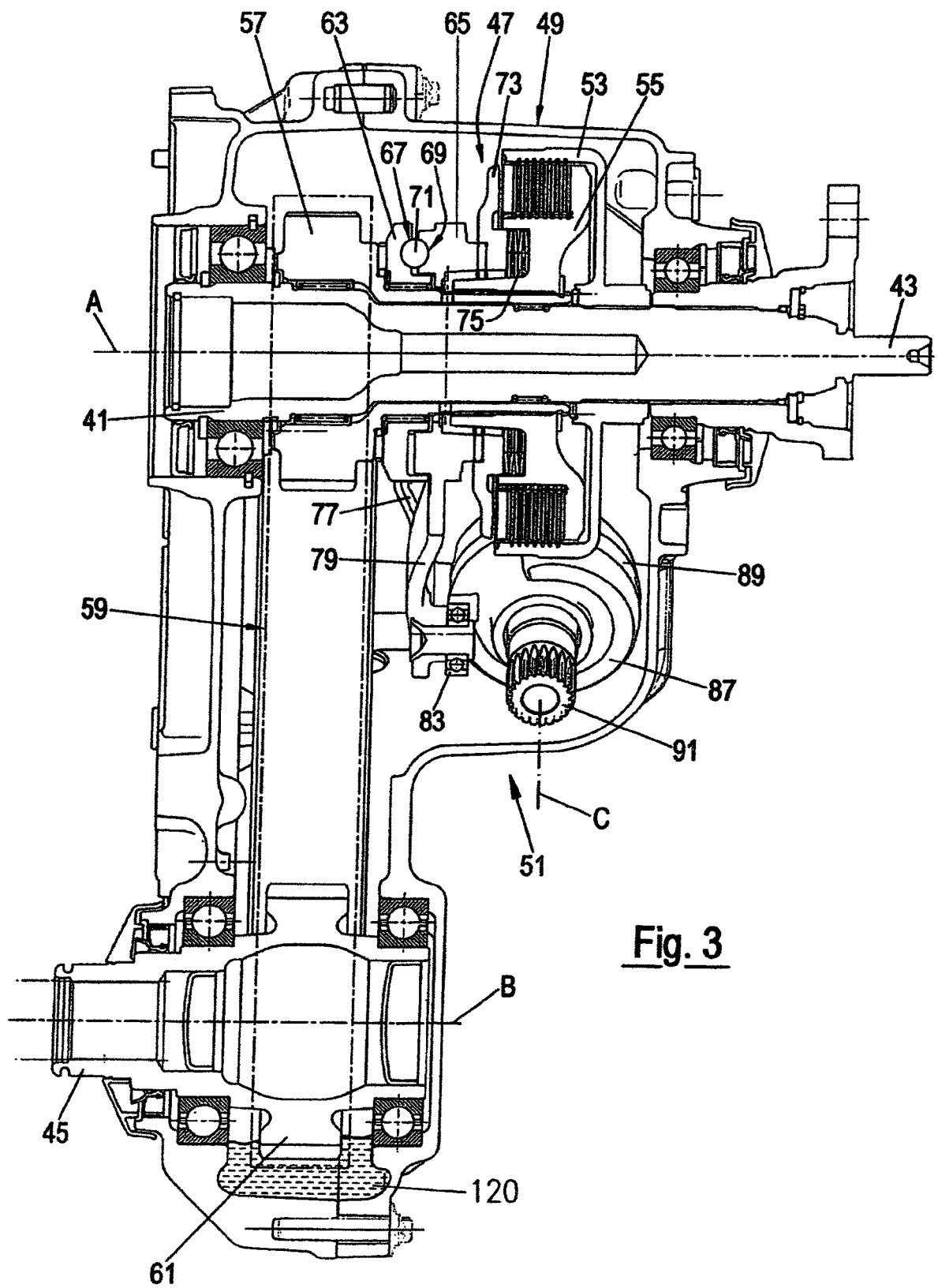
Figure 6:
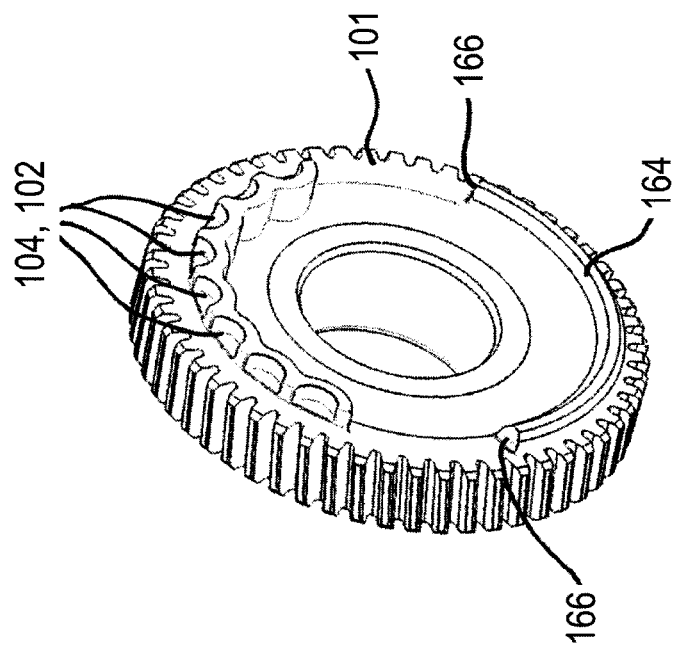
Figure 4:
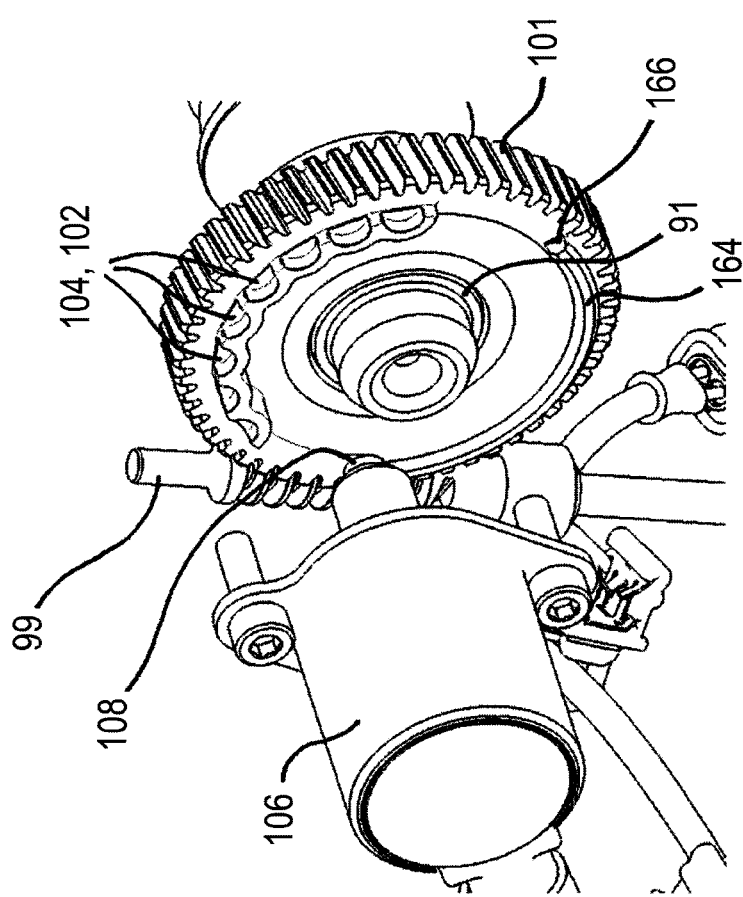
Figure 5:
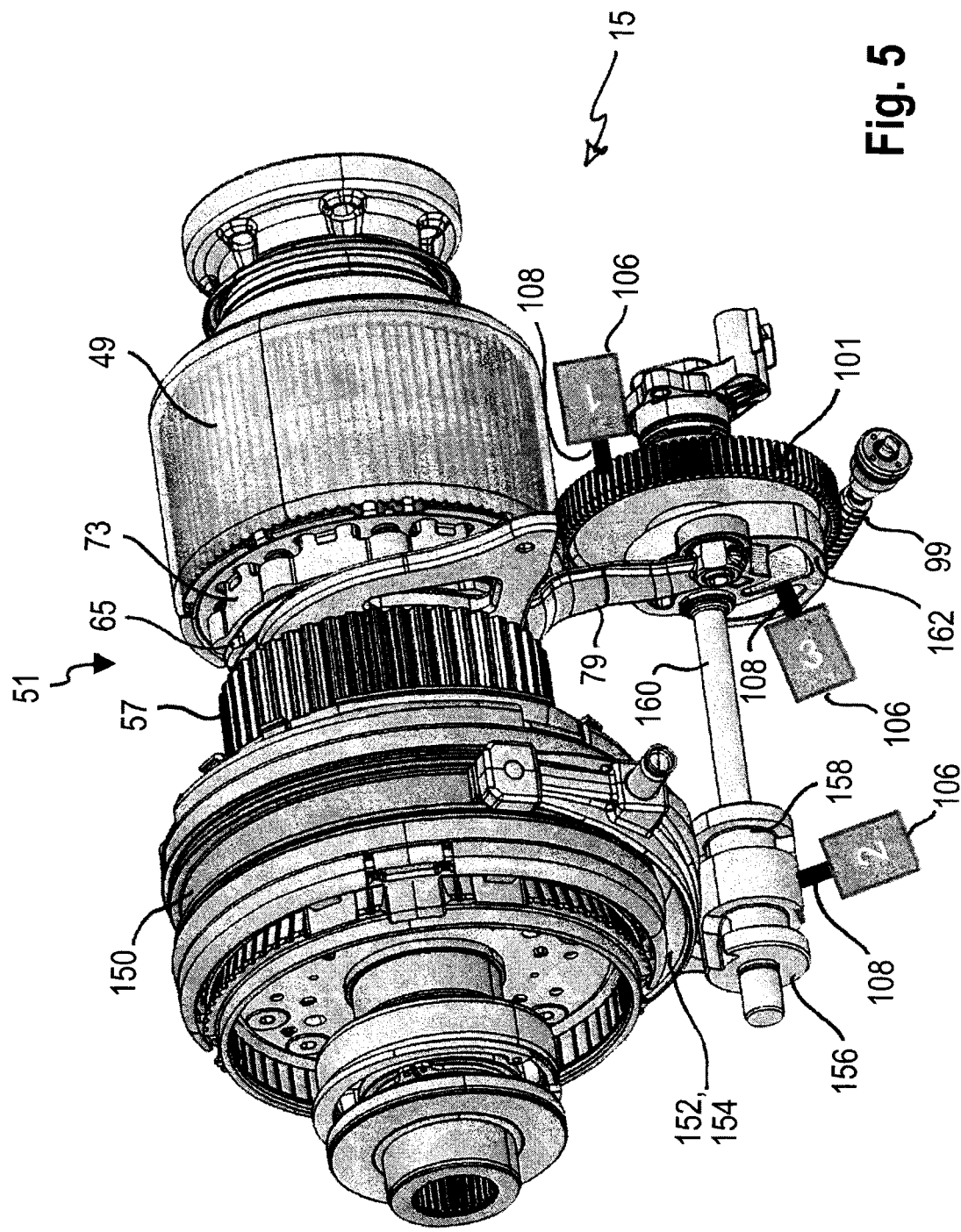

In the following text, the invention will now be described purely by way of example with reference to the drawing, in which:

FIG. 1 shows a diagrammatic view of a drive train of a vehicle,

FIG. 2 shows a diagrammatic view of a transfer gearbox according to the invention without a reduction gear stage, FIG. 3 shows a cross-sectional view of the transfer gearbox according to FIG. 2, FIG. 4 shows a perspective illustration of a reduction gear unit for actuating the actuator of the transfer gearbox according to FIG. 3, FIG. 5 shows a perspective illustration of a transfer gearbox according to the invention with a reduction gear stage, and FIG. 6 shows a perspective illustration of the worm gear of the reduction gear unit of the transfer gearbox from FIG. 5.

DETAILED DESCRIPTION OF THE EXAMPLE EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

FIG. 1 diagrammatically shows a drive train of a motor vehicle with switchable all-wheel drive. The drive torque which is generated by an internal combustion engine 11 is fed to a transfer gearbox 15 via a main gearbox 13 in the form, for example, of a manual gearbox or an automatic gearbox. A first output of the transfer gearbox 15 is coupled via a cardan shaft 17 to a rear axle differential transmission 19. As a result, the wheels 21 of the rear axle 23 are driven permanently. The rear axle 23 therefore forms the primary axle of the vehicle. A second output of the transfer gearbox 15 is coupled via a cardan shaft 25 to a front axle differential transmission 27. As a result, a portion of the drive torque of the internal combustion engine 11 can be transmitted optionally to the wheels 29 of the front axle 31. The front axle 31 therefore forms the secondary axle of the vehicle.

Furthermore, FIG. 1 shows a vehicle dynamics control unit 33. The latter is connected to wheel rotational speed sensors 35, 37 which are assigned to the wheels 21 of the rear axle 23 and the wheels 29 of the front axle 31, respectively. The vehicle dynamics control unit 33 is also connected to further sensors 39, for example a yaw rate sensor. In a manner which is dependent on the signals of the sensors 35, 37, 39, the vehicle dynamics control unit 33 generates a control signal which is fed to a control device (not shown in FIG. 1) of the transfer gearbox 15, in order to set a defined distribution of the drive torque between the two axles 23, 31 of the vehicle as a result. Said control signal is, in particular, a setpoint value of a clutch torque, that is to say a torque requirement for a clutch unit of the transfer gearbox 15.

FIG. 2 shows a diagrammatic cross-sectional view of the transfer gearbox 15 according to FIG. 1. The transfer gearbox 15 has an input shaft 41, a first output shaft 43 and a second output shaft 45. The first output shaft 43 is configured coaxially with respect to the input shaft 41 and fixedly to the latter so as to rotate with it, preferably in one piece. The second output shaft 45 is arranged offset in parallel with respect to the input shaft 41.

The transfer gearbox 15 has a clutch unit 47 with a friction clutch 49 and an actuator unit 51. The friction clutch 49 has a clutch basket 53 which is connected fixedly to the input shaft 41 and the first output shaft 43 so as to rotate with them and carries a plurality of clutch disks. Furthermore, the friction clutch 49 has a rotatably mounted clutch hub 55 which likewise carries a plurality of clutch disks which engage in an alternating arrangement into the disks of the clutch basket 53. The clutch hub 55 is connected fixedly to a drive gearwheel 57 of a chain drive 59 so as to rotate with it. An output gear wheel 61 of the chain drive 59 is connected fixedly to the second output shaft 45 so as to rotate with it. Instead of the chain drive 59, a gear drive can be provided, for example with an intermediate gearwheel between said gearwheels 57, 61.

An increasing proportion of the drive torque which is introduced into the transfer gearbox 15 via the input shaft 41 can be transmitted to the second output shaft 45 by way of actuation of the actuator unit 51 in the engagement direction of the friction clutch 49.

FIG. 3 shows details of the transfer gearbox 15 according to FIG. 2 in a cross-sectional view. It can be seen, in particular, that the actuator unit 51 has a supporting ring 63 which is configured as a ramp ring and an adjusting ring 65 which is likewise configured as a ramp ring, which rings 63, 65 are mounted such that they can be rotated with regard to the rotational axis A of the input shaft 41 and the first output shaft 43. The supporting ring 63 is supported axially on the drive gearwheel 57 via an axial bearing. In contrast, the adjusting ring 65 is mounted in an axially displaceable manner. On the sides which face one another, the supporting ring 63 and the adjusting ring 65 in each case have a plurality of ball grooves 67 and 69, respectively. The latter run in the circumferential direction with regard to the axis A and are inclined in a ramp-like manner in the circumferential direction with regard to a perpendicular plane with respect to the axis A, that is to say the ball grooves 67, 69 have a varying depth in the circumferential direction, for which reason the two rings 63, 65 are also called ramp rings here. In each case one ball groove 67 of the supporting ring 63 and one ball groove 69 of the adjusting ring 65 lie opposite one another and in the process enclose an associated ball 71. Therefore, an axial displacement of the adjusting ring 65 can be brought about by way of rotation of the supporting ring 63 and the adjusting ring 65 relative to one another, the adjusting ring 65 interacting with a thrust ring 73 of the friction clutch 49 via an axial bearing. The thrust ring 73 is prestressed in the disengagement direction of the friction clutch 49 by means of a cup spring arrangement 75.

A respective actuating lever 77 and 79, respectively, is formed integrally on the supporting ring 63 and on the adjusting ring 65. A respective roller 81 and 83, respectively, is mounted rotatably at the free end of each lever 77, 79. Via the rollers 81, 83, the actuating levers 77, 79 interact with the two end sides 85, 87 of a disk cam 89 which can be rotated with regard to an axis C. With regard to a perpendicular plane with respect to the axis C, the end sides 85, 87 have a course which is inclined in the circumferential direction, that is to say the disk cam 89 is of wedge-shaped configuration in cross section. The actuating levers 77, 79 can therefore be moved in a scissor-like manner by way of rotation of the disk cam 89, in order to rotate the supporting ring 63 and the adjusting ring 65 relative to one another. The disk cam 89 has an integrally formed spline attachment 91. Via the latter, the disk cam 89 can be drive-connected to an electric motor (not shown) and an associated reduction gear unit 97, as will be described more precisely in the following text with reference to FIG. 4.

Therefore, the disk cam 89 can be driven to perform a rotational movement by way of corresponding actuation of said electric motor, in order to pivot the actuating levers 77, 79 relative to one another as a result. The rotation which is caused as a result of the supporting ring 63 and the adjusting ring 65 relative to one another brings about an axial movement of the adjusting ring 65. The thrust ring 73 therefore brings about an engagement of the friction clutch 49 or, in a manner which is assisted by the cup spring arrangement 75, a disengagement of the friction clutch 49.

It can also be seen from FIG. 3 that the lower part of the housing of the transfer gearbox 15 forms an oil sump 120 which receives oil for cooling and lubricating the friction clutch 47 and the further components of the transfer gearbox 15.

FIG. 4 shows a perspective illustration of the abovementioned reduction gear unit, via which the disk cam 89 and therefore the actuator unit 51 can be actuated in order to engage the friction clutch 49. In the case of the embodiment which is shown here, the reduction gear unit is configured as a worm gear unit with a worm gear shaft 99 which is driven by an electric motor (not shown) and a worm gear 101 which is in meshing engagement with the former and is connected in a positively locking manner to the spline attachment 91 of the disk cam 89.

As can be gathered from FIG. 4, furthermore, a latching means 102 with a multiplicity of receptacles 104 which are spaced apart from one another uniformly in the circumferential direction is configured laterally on the worm gear 101. The actuator member in the form of the worm gear 101 and therefore the engagement state of the friction clutch 49 can be locked by means of said receptacles 104, by a latch 108 which can be actuated by means of an electromagnet 106 being brought into engagement in a positively locking manner with one of the receptacles 104. Therefore, the engagement state of the friction clutch 49 can be blocked by way of the positively locking engagement of the latch 108 into one of the receptacles 104, in order for it to be possible for a drive connection between the two output shafts 43, 45 or between the primary axle and the secondary axle of the vehicle to be established or maintained, for example, even in the case of a parked vehicle. Therefore, if the primary axle of the vehicle is blocked by means of a parking brake, for example in the case of a parked vehicle, the braking action which is brought about as a result likewise acts by way of the blocking of the friction clutch 49 on the secondary axle of the vehicle, with the result that the primary axle and the secondary axle are blocked.

Although the latching means 102 is formed in the case of the embodiment which is shown here by way of a multiplicity of U-shaped projections which are connected among one another and are configured laterally on the worm gear 101, the latching means 102 in accordance with another embodiment can also be formed, for example, by way of a multiplicity of bores which extend at least partially through the worm gear 101 in the axial direction. The toothing system of the worm gear 101 itself can also likewise be used as latching means; in this case, the design or shape of the latch 108 would have to be adapted to the toothing system in a targeted manner.

In contrast to the embodiment which is shown, however, the latch 108 can also engage into another actuator member for blocking the friction clutch 49, which other actuator member is situated in the power flow path upstream of the actuator unit 51. It would likewise be possible to configure corresponding receptacles 104, for example, on the outer circumference of the adjusting ring 65 which is configured as a ramp ring, into which receptacles 104 an electromagnetically actuable latch can engage in the radial direction in order to block the friction clutch 49.

In the following text, a further embodiment of a transfer gearbox 15 according to the invention will now be described. In contrast to the transfer gearbox 15 which was described above with reference to FIGS. 2 and 3, said transfer gearbox 15 additionally has a reduction gear stage 150 in the form of a planetary transmission. Said reduction gear stage 150 is positioned upstream of the friction clutch 49 and serves for shifting a direct or HI operating mode and a stepped-down or LO operating mode, as is fundamentally known from DE 10 2015 225 290 A1. Here, the shifting over between said two operating modes takes place by means of a shifting clutch 152 via a selector sleeve 154, by means of which the planetary transmission of the reduction gear stage 150 can be locked selectively in order to establish the direct or HI operating mode. Here, the actuation of the selector sleeve 154 takes place via a shifting actuator 156 which has a shifting guide plate 158, into which a driver pin (not shown) which is provided on the selector sleeve 154 engages. Therefore, depending on the rotational position of the shifting actuator 156, the selector sleeve 154 is moved in the axial direction for selectively locking the planetary transmission of the reduction gear stage 150.

Here, the actuation of the selector sleeve 154 and therefore of the shifting clutch 152 takes place via an actuator shaft 160 which is drive-connected to the shifting actuator 156. In the case of said embodiment of the transfer gearbox 15, the worm gear 101 is also drive-connected to said actuator shaft 160, which worm gear 101 is a constituent part of the reduction gear unit 97, via which the actuator unit 51 can be actuated by an electric motor (not shown here) in order to engage the friction clutch 49.

The reduction gear unit 97 also comprises a worm gear shaft 99 here which is driven by the electric motor (not shown) and meshes with the worm gear 101. Unlike in the case of the transfer gearbox 15 which is shown with reference to FIGS. 2 and 3, the actuation of the actuator unit 51 takes place here via a cam element 162 which is likewise drive-connected to the actuator shaft 160 and deflects the actuating lever 79 of the adjusting ring 65 which is configured as a ramp ring to a different extent depending on the rotational position, with the result, even in the case of said embodiment, that the friction clutch 49 can also be engaged if required via the reduction gear unit 97 which is driven by an electric motor. With regard to further details of said transfer gearbox 15 and, in particular, with regard to the method of operation of said transfer gearbox 15, reference is to be made at this point explicitly to DE 10 2015 225 290 A1 and, in particular, to FIGS. 2 to 10 of said document and the associated description of the figures, where the method of operation of the transfer gearbox with an upstream reduction gear stage is described in great detail, with the difference that the reduction gear unit for actuating the actuator unit in order to engage the friction clutch is not formed there by way of a worm gear unit but rather by way of a spur gear unit.

Since, in the case of the transfer gearbox 15 which is shown in FIG. 5, both the shifting clutch 152 and the friction clutch 49 are actuated via the reduction gear unit 97 by the electric motor (not shown here) which sets the actuator shaft 160 in rotation via the reduction gear unit 97, which actuator shaft 160 is drive-connected to both the cam element 162 and to the shifting actuator 156, further possibilities are provided, in order for it to be possible for the friction clutch 49 to be locked.

Thus, in accordance with the transfer gearbox 15 which is described with reference to FIGS. 2 and 3, a corresponding latching means can be provided on the worm gear 101 to this end, with which latching means a latch 108 can be brought into engagement as required by way of actuation of an electromagnet 106, as is shown at the position "1" in FIG. 5. As an alternative to this, however, a corresponding latching means can also be provided, for example, on the cam element 162, into which a latch 108 can be brought into engagement as required by way of actuation of an electromagnet 106, as is shown in FIG. 5 by way of the position "3". A corresponding latching means can also be provided on the shifting actuator 156, into which latching means an electromagnetically actuable latch 108 can engage (shown in FIG. 5 by way of the position "2"), in order for it thus to be possible for the friction clutch 49 of the transfer gearbox 15 to be blocked as required. Thus, namely the shifting actuator 156, the cam element 162 and the worm gear 101 are in each case drive-connected to the actuator unit 51 for actuating the friction clutch 49, which means that an adjustment of the shifting actuator 156, of the cam element 162 or of the worm gear 101 has an effect on the engagement state of the friction clutch 49. To this extent, it is possible to block the actuator unit 151 and therefore the friction clutch 49 by way of fixing of the shifting actuator 156, the cam element 162 or the worm gear 101, in order for it to be thus possible in the desired way for a brake force which acts on a primary axle of the vehicle by way of a parking brake to be likewise transmitted to the secondary axle of the vehicle.

As can be gathered from FIG. 6 which shows a perspective illustration of the worm gear 101 of the reduction gear unit 97 of the transfer gearbox 15 according to FIG. 5, a rib 164 which extends in the circumferential direction is configured laterally on the worm gear 101 in addition to the latching means 102, which rib 164 is delimited in the circumferential direction by way of a first and a second end face 166. Here, the actuating range for the shifting clutch 152 is defined by way of said rib 164 and, in particular, its two end faces 166, in the range of which actuating range the reduction gear stage 150 is shifted over between the direct or HI operating mode and the stepped-down or LO operating mode by way of rotation of the shifting actuator 156.

Since the latch 108 is preferably extended in the case of a non-energized electromagnet 106, the latch 108 therefore comes into contact with one of the two end faces 166 of the rib 164 when the worm gear 101 is rotated to a corresponding extent. If the electromagnet 106 is therefore not deliberately energized, in order to withdraw the latch 108, the two end faces 166 of the rib 164 which serve as a stop can therefore ensure that switching over cannot be carried out unintentionally between the direct or high operating mode and the stepped-down or low operating mode.

Moreover, with a knowledge of the position of the two end faces 166 which serve as a stop, the precise rotational position of the actuator shaft 160 can be determined, without an additional sensor being required to this end. Thus, the rotational position of the actuator shaft 160 can be initialized, for example, during a starting operation of a vehicle, by the actuator shaft 160 being rotated until one of the two stops 166 comes into contact with the latch 108. In this way, within the context of an initialization, the absolute rotational position of the actuator shaft 160 can be determined, with the result that no additional sensor is required to this end.

While the invention has been described by way of example for a "torque on demand" transfer gearbox with reference to the drawing, the invention is also used in the case of different types of transfer gearboxes, in particular in the case of a controllable center differential or in the case of a transfer gearbox with what is known as a "hang-on clutch", as was mentioned at the outset in relation to U.S. Pat. No. 7,111,716 B2.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF DESIGNATIONS

11 Internal combustion engine
13 Main gearbox
15 Transfer gearbox
17 Cardan shaft
19 Rear axle differential transmission
21 Wheel
23 Rear axle
25 Cardan shaft
27 Front axle differential transmission
29 Wheel
31 Front axle
33 Vehicle dynamics control unit
35 Wheel rotational speed sensor
37 Wheel rotational speed sensor
39 Sensor
41 Input shaft
43 First output shaft
45 Second output shaft
47 Clutch unit
49 Friction clutch
51 Actuator unit
53 Clutch head
55 Clutch hub
57 Drive gearwheel
59 Chain drive
61 Drive gearwheel
63 Supporting ring
65 Adjusting ring
67 Ball groove
69 Ball groove
71 Ball
73 Thrust ring
75 Cup spring arrangement
77 Actuating lever
79 Actuating lever
83 Roller
85 End side
87 End side
89 Disk cam
91 Spline attachment
97 Reduction gear unit
99 Worm
101 Worm gear
102 Latching means
104 Receptacles
106 Electromagnet
108 Latch
120 Oil sump
150 Reduction gear stage
152 Shifting clutch
154 Selector sleeve
156 Shifting actuator
158 Shifting guide plate
160 Actuator shaft
162 Cam element
164 Rib
166 End faces, stops

The invention claimed is:

1. A transfer gearbox having an input shaft, a first output shaft, a second output shaft, a friction clutch configured to control transmission of a drive torque from the input shaft to the first output shaft and to the second output shaft based on an engagement state of the friction clutch, a rotationally driven actuator unit for controlling the engagement state of the friction clutch, and an electromagnetically actuable latch for selectively locking the actuator unit.

2. The transfer gearbox as claimed in claim 1, wherein a variable proportion of a drive torque which is transmitted from the input shaft to the first output shaft is transmitted to the second output shaft by the friction clutch in a manner which is dependent on the engagement state of the friction clutch.

3. The transfer gearbox as claimed in claim 1, wherein the actuator unit comprises at least one rotatable actuator member into which the electromagnetically actuable latch engages for locking the actuator unit.

4. The transfer gearbox as claimed in claim 3, wherein the actuator member of the actuator unit has a plurality of receptacles for the engagement of the electromagnetically actuable latch.

5. The transfer gearbox as claimed in claim 3, wherein the actuator member is a ramp ring of the actuator unit, wherein the ramp ring is driven at least indirectly by an electric motor, or wherein the actuator member is a torque transmission element of the actuator unit in a power flow path upstream of the ramp ring, the torque transmission element including an actuator shaft, or a gearwheel which is connected fixedly to the actuator shaft so as to rotate with the actuator shaft, or a cam element which is drive-connected to the actuator shaft.

6. The transfer gearbox according to claim 1, further including a step-down gear mechanism stage which is driven by the input shaft, a shifting clutch with a first shifting position in which the step-down gear mechanism stage establishes a direct drive connection between the input shaft and the first output shaft, and a second shifting position in which the step-down gear mechanism stage establishes a drive connection between the step-down gear mechanism stage and the first output shaft, and a shifting actuator configured to shift the shifting clutch between its first and its second shifting position, and wherein both the shifting actuator for shifting the shifting clutch and the actuator unit for controlling the engagement state of the friction clutch are drive-connected to an actuator shaft.

7. The transfer gearbox as claimed in claim 6, wherein for locking as required both of the friction clutch and of the shifting clutch, the electromagnetically actuable latch engages into a gearbox element which is connected fixedly to the shifting actuator, to which end the gearbox element has a plurality of receptacles for the engagement of the electromagnetically actuable latch.

8. The transfer gearbox according to claim 7, wherein at least one stop is provided and positioned on the gearbox element which has the plurality of receptacles for the engagement of the electromagnetically actuable latch, in such a way that, when the latch bears against the at least one stop, a further rotation of the actuator shaft and therefore shifting the shifting clutch between its first shifting position and its second shifting position are prevented.

9. The transfer gearbox as claimed in claim 8, wherein the at least one stop includes a first stop and a second stop, the first stop being positioned in such a way that, in the first shifting position of the shifting clutch when the latch bears against the first stop, a further rotation of the actuator shaft and therefore shifting over of the shifting clutch out of its first shifting position and its second shifting position are prevented, and the second stop being positioned in such a way that, in the second shifting position of the shifting clutch when the latch bears against the second stop, a further rotation of the actuator shaft and therefore shifting over of the shifting clutch out of its second shifting position and its first shifting position are prevented.

10. The transfer gearbox as claimed in claim 9, wherein the plurality of receptacles for the engagement of the electromagnetically actuable latch are spaced apart from one another uniformly along a circular path, whereas the first stop is spaced apart from a first receptacle of the plurality of receptacles and the second stop is spaced apart from a last receptacle of the plurality of receptacles, by in each case a greater clearance.

11. The transfer gearbox according to claim 10, wherein the latch is axially moveable in response to energization of an electromagnet in response to instructions from a control unit.

12. The transfer gearbox as claimed in claim 11, wherein the latch is extended in a non-energized state of the electromagnet, in order to be in engagement with one of the stops or one of the plurality of receptacles, whereas the latch is not extended in an energized state of the electromagnet, in order to prevent the latch from passing into engagement with one of the stops or one of the plurality of receptacles.

13. The transfer gearbox as claimed in claim 11, wherein the electromagnet is energized as a consequence of a user-initiated actuation of the friction clutch or the shifting clutch.

14. The transfer gearbox as claimed in claim 5, wherein the actuator shaft is driven by the electric motor.

15. The transfer gearbox as claimed in claim 5, wherein the gearwheel is a worm gear.

16. The transfer gearbox as claimed in claim 6, wherein the step-down gear mechanism stage is a planetary gear mechanism.

17. A transfer gearbox, comprising:
an input shaft, a first output shaft, and a second output shaft;
a friction clutch configured to control transmission of a drive torque from the input shaft to the first and second output shafts based on an engagement state of the friction clutch;
a rotationally driven actuator unit configured to control the engagement state of the friction clutch; and
an electromagnetically actuable latch configured to selectively lock the actuator unit.

18. The transfer gearbox as claimed in claim 17, wherein a variable proportion of a drive torque which is transmitted from the input shaft to the first output shaft is transmitted to the second output shaft by the friction clutch in a manner which is dependent on the engagement state of the friction clutch.

19. The transfer gearbox as claimed in claim 17, wherein the actuator unit comprises at least one rotatable actuator member into which the electromagnetically actuable latch engages for locking the actuator unit.

20. The transfer gearbox as claimed in claim 19, wherein the actuator member of the actuator unit has a plurality of receptacles for the engagement of the electromagnetically actuable latch.

\* \* \* \* \*